United States Patent
Fekete et al.

(10) Patent No.: US 12,175,848 B2
(45) Date of Patent: Dec. 24, 2024

(54) COMPUTER IMPLEMENTED METHOD, APPARATUS AND COMPUTER PROGRAM FOR PRIVACY MASKING VIDEO SURVEILLANCE DATA

(71) Applicant: CANON KABUSHIKI KAISHA, Tokyo (JP)

(72) Inventors: Robert Fekete, Brøndby (DK); Miloš Zlatkovic, Brøndby (DK); Constantin Teodor Gherghescu, Brøndby (DK); Jesper Højbjerg Jakobsen, Brøndby (DK); Mustafa Temiz, Brøndby (DK); Agnes Ruphavathani Jensen, Brøndby (DK)

(73) Assignee: Canon Kabushiki Kaisha, Tokyo (JP)

( * ) Notice: Subject to any disclaimer, the term of this patent is extended or adjusted under 35 U.S.C. 154(b) by 92 days.

(21) Appl. No.: 18/249,045

(22) PCT Filed: Sep. 21, 2021

(86) PCT No.: PCT/EP2021/075981
§ 371 (c)(1),
(2) Date: Apr. 13, 2023

(87) PCT Pub. No.: WO2022/083956
PCT Pub. Date: Apr. 28, 2022

(65) Prior Publication Data
US 2023/0368629 A1   Nov. 16, 2023

(30) Foreign Application Priority Data
Oct. 23, 2020  (GB) ..................... 2016893

(51) Int. Cl.
G08B 13/196 (2006.01)
G06F 18/00 (2023.01)
(Continued)

(52) U.S. Cl.
CPC . *G08B 13/19686* (2013.01); *G08B 13/19671* (2013.01)

(58) Field of Classification Search
None
See application file for complete search history.

(56) References Cited

U.S. PATENT DOCUMENTS

| 2006/0064384 A1 | 3/2006 | Mehrotra et al. |
| 2008/0005778 A1* | 1/2008 | Chen ............ G06Q 10/10 726/1 |

(Continued)

FOREIGN PATENT DOCUMENTS

| GB | 2569572 A * | 6/2019 | ............ H04N 5/272 |

OTHER PUBLICATIONS

Bhavani Thuraisingham, et al., Access Control, Confidentiality and Privacy for Video Surveillance Databases, AVI '06 Proceedings of the Working Conference on Advanced Visual Interfaces, ACM, Jun. 7, 2006, XP058213644.

(Continued)

*Primary Examiner* — Hung Q Dang
(74) *Attorney, Agent, or Firm* — Canon U.S.A., Inc. IP Division

(57) ABSTRACT

A computer implemented method of privacy masking video surveillance data is provided, wherein the video surveillance data includes metadata associated with video data, the metadata describing objects or activity in the video data. A location of each item of metadata within its respective frame is compared with privacy mask data defining a position of a privacy mask in the frame; and based on the comparison, it is determined if the metadata is to be masked. The item of metadata is masked if it is determined that the item of metadata is to be masked.

15 Claims, 3 Drawing Sheets

(51) Int. Cl.
*G06V 20/52* (2022.01)
*H04N 7/18* (2006.01)

(56) References Cited

U.S. PATENT DOCUMENTS

| | | |
|---|---|---|
| 2011/0041061 A1 | 2/2011 | Cohen et al. |
| 2018/0107580 A1* | 4/2018 | Zhang .................... G06V 30/40 |
| 2018/0330591 A1 | 11/2018 | Tilkin et al. |
| 2019/0279344 A1* | 9/2019 | Duggal ............... G06F 18/2411 |
| 2020/0074678 A1* | 3/2020 | Ning .................... G06V 10/764 |
| 2020/0236302 A1 | 7/2020 | Park |
| 2020/0293767 A1* | 9/2020 | Choi ..................... G06V 20/52 |
| 2021/0192816 A1* | 6/2021 | Watanabe .............. G06V 20/40 |
| 2023/0162503 A1* | 5/2023 | Watanabe .............. H04N 23/65 |
| | | 348/143 |
| 2023/0169773 A1* | 6/2023 | Watanabe .............. G06V 20/52 |
| | | 382/103 |

OTHER PUBLICATIONS

Andrew Senior, et al., Enabling Video Privacy through Computer Vision, Security & Privacy, IEEE, IEEE Sevice Center, vol. 3, No. 3, May 1, 2005, XP011134788.

\* cited by examiner

COMPUTER IMPLEMENTED METHOD, APPARATUS AND COMPUTER PROGRAM FOR PRIVACY MASKING VIDEO SURVEILLANCE DATA

CROSS REFERENCE TO RELATED APPLICATION

This application is the National Phase application of PCT Application No. PCT/EP2021/075981, filed on Sep. 21, 2021. This application claims the benefit under 35 U.S.C. § 119 (a)-(d) of United Kingdom Patent Application No. 2016893.6, filed on Oct. 23, 2020 and entitled 'A COMPUTER IMPLEMENTED METHOD, APPARATUS AND COMPUTER PROGRAM FOR PRIVACY MASKING VIDEO SURVEILLANCE DATA". The above cited patent applications are incorporated herein by reference in their entirety.

TECHNICAL FIELD OF THE INVENTION

The present invention relates to a method, apparatus and computer program for privacy masking video surveillance data. In particular, the invention relates to privacy masking of metadata associated with video data, the metadata describing objects or activity in the video data.

BACKGROUND OF THE INVENTION

Many video analytics software modules are available which can analyse video surveillance data and detect specific objects or activity. These will typically attach metadata to the video stream indicating a time and position in the frame where the objects or activity have been detected, together with data describing the nature of the detected object or activity. Examples of types of object which can be detected are people, cars, license plates etc. Some object recognition algorithms are sophisticated enough to categorize people by age and gender, and metadata can indicate characteristics of detected objects such as colour or type of vehicle or age of a person or gender of a person. Some video analytics modules can also detect activity such as patterns of behaviour such as loitering, and these can also be indicated by metadata included in the video surveillance data and associated with the video data. Once metadata has been included in video surveillance data, it can be used to conduct searches for particular objects, activities or events. For example, a search could be carried out for a black SUV, or a person of a particular age, gender and hair colour, or a vehicle with a particular license plate.

Video analytics software which generate metadata can be run in various locations. Analytics software can be run on the camera, on an analytics server, a recording server or at a client device. In a cloud based system, video analytics may be run in the cloud.

It is increasingly necessary to apply privacy masking to video surveillance data when it is viewed and recorded. In many countries, it is not allowed to record people unless they are masked. Some video cameras monitoring commercial premises may have a field of view that includes private property where privacy laws restrict the recording of video data. In this case, it is necessary to apply a privacy mask to a portion of the frame of the recorded data when it is viewed. A privacy mask is applied to the video data by obscuring a portion of the video frame, for example by a solid colour, or by pixelation or another form of blurring.

SUMMARY OF THE INVENTION

The present invention provides a computer implemented method of privacy masking video surveillance data.

With current methods of applying privacy masks to video surveillance data, only the video data itself is masked and the mask is applied to the video data when it is viewed. However, if a metadata search is carried out, even if a privacy mask is applied to the video data, metadata relating to locations behind the privacy mask can be found by a search and search results which might be in the form of a thumbnail or video clip, can reveal parts of the masked video. Therefore, search results can leak information which should be protected. For example, if a search for a blond male is carried out, search results can show that such a person is present in the video feed even if the actual video data is obscured by the privacy mask. Leaked information can be even more specific if, for example, license plate recognition or facial recognition is used.

According to the present invention, the metadata is masked in accordance with the privacy mask. The masking of the metadata means that it is not visible to a metadata search. Thus, metadata which relates to objects which are located in a privacy masked area of a video frame will not appear in a metadata search.

BRIEF DESCRIPTION OF THE DRAWINGS

Embodiments of the present invention will now be described, by way of example only, with reference to the accompanying drawings in which.

DETAILED DESCRIPTION OF THE INVENTION

Figure 1:
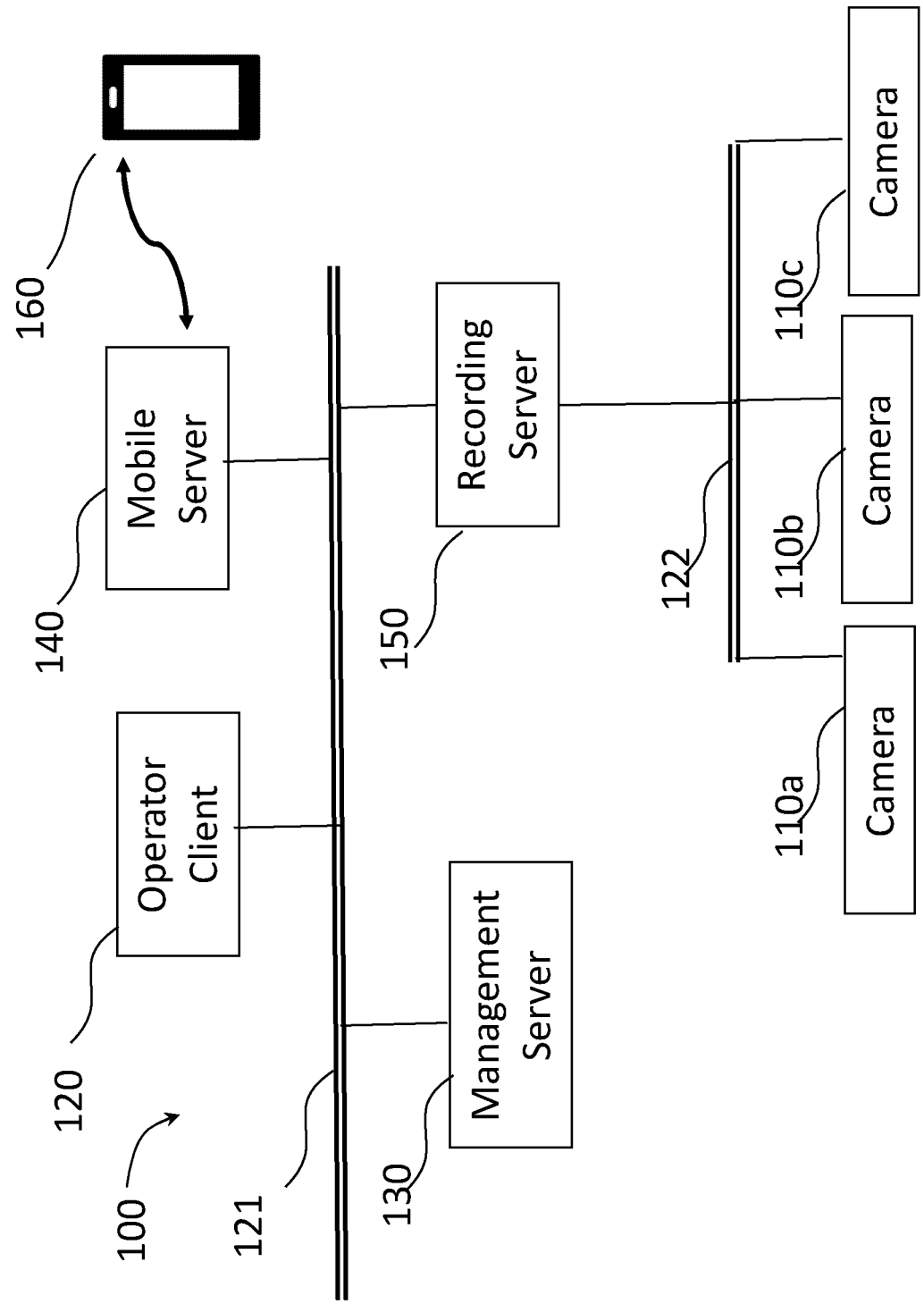
FIG. 1 shows a video surveillance system in which the present invention can be implemented.

FIG. 1 shows an example of a video surveillance system 100 in which embodiments of the invention can be implemented. The system 100 comprises a management server 130, a recording server 150 and a mobile server 140. Further servers may also be included, such as further recording servers, archive servers or analytics servers. A plurality of video surveillance cameras 110a, 110b, 110c send video data to the recording server 150. An operator client 120 is a fixed terminal which provides an interface via which an operator can view video data live from the cameras 110a, 110b, 110c, or recorded video data from the recording server 150.

The cameras 110a, 110b, 110c capture image data and send this to the recording server 150 as a plurality of video data streams.

The recording server 150 stores the video data streams captured by the video cameras 110a, 110b, 110c. Video data is streamed from the recording server 150 to the operator client 120 depending on which live streams or recorded streams are selected by an operator to be viewed.

The mobile server 140 communicates with a user device 160 which is a mobile device such as a smartphone or tablet which has a touch screen display. The user device 160 can access the system from a browser using a web client or a mobile client. Via the user device 160 and the mobile server

140, a user can view recorded video data stored on the recording server 150. The user can also view a live feed via the user device 160.

Other servers may also be present in the system 100. For example, an archiving server (not illustrated) may be provided for archiving older data stored in the recording server 150 which does not need to be immediately accessible from the recording server 150, but which it is not desired to be deleted permanently. A fail-over recording server (not illustrated) may be provided in case a main recording server fails. An analytics server can also run analytics software for image analysis, for example motion or object detection, facial recognition, event detection.

The operator client 120 and the mobile server 140 are configured to communicate via a first network/bus 121 with the management server 130 and the recording server 150. The recording server 150 communicates with the cameras 110a, 110b, 110c via a second network/bus 122.

The management server 130 includes management software for managing information regarding the configuration of the surveillance/monitoring system 100 such as conditions for alarms, details of attached peripheral devices (hardware), which data streams are recorded in which recording server, etc. The management server 130 also manages user information such as operator permissions. When an operator client 120 is connected to the system, or a user logs in, the management server 130 determines if the user is authorised to view video data. The management server 130 also initiates an initialisation or set-up procedure during which the management server 130 sends configuration data to the operator client 120. The configuration data defines the cameras in the system, and which recording server (if there are multiple recording servers) each camera is connected to. The operator client 120 then stores the configuration data in a cache. The configuration data comprises the information necessary for the operator client 120 to identify cameras and obtain data from cameras and/or recording servers.

Object detection/recognition can be applied to the video data by object recognition software. The object recognition software generates metadata which is associated with the video stream and defines where in a frame an object has been detected. The metadata may also define what type of object has been detected eg person, car, dog, bicycle. It also might define characteristics of the object eg colour or model of a vehicle, gender of a person. Other types of video analytics software can also generate metadata, such as behaviour detection (eg loitering detection), license plate recognition, or facial recognition.

The object detection/recognition software, or any video analytics software that generates metadata, may be run on the operator client 120, or on an analytics server, or on the recording server 150, or may run on the camera itself. It is not essential to the present invention where the metadata is generated. The metadata may be stored in the recording server with the video surveillance data, and streamed to the operator client with or without its associated video data.

It is known to provide privacy masking on the field of view of a camera. Such privacy masking may be in the form of a blocked out, pixelated or blurred area covering part of the field of view that is to be obscured. The privacy mask is applied to the live view and also when recorded data is viewed. However, it can be provided that users with certain privilege levels (eg admin rights) can lift the privacy mask to view the unobscured video data.

According to the present invention, the privacy masking is also applied to the metadata. The location of the a privacy masked region in the frame can be compared with location data in the metadata, so that any metadata relating to an object or activity having a location that falls within the privacy masked region is masked. The masked metadata is either excluded or flagged in a way that it will not appear in a metadata search.

For example, the privacy masking of the metadata may be carried out by the operator client 120, on the basis of privacy mask data which defines a position of a privacy masked region in the frame. The privacy mask is applied by the operator client 120, which stores privacy mask data or retrieves privacy mask data from the management server 130 and applies the mask to the camera feed when it is viewed (either live or recorded).

The privacy mask data may be stored on the management server 130, and sent to the operator client 120 as part of the configuration data which is sent to the operator client 120 as part of the initialisation/set up procedure described above. The privacy mask data will be specific to a particular camera and may also be specific to a time period. This allows for privacy masks for a specific camera to be varied over time, for example if the camera's location or orientation is changed. The operator client 120 may receive only the "current" privacy mask data for each camera as part of the initialisation/set up procedure, but if a previous version is required, for example if older recorded data is being viewed, the operator client 120 can query the management server 130 for the correct privacy mask data for the time period required.

The privacy mask data will include coordinates defining the area of each frame which will be masked. The privacy mask data may also include specific time restraints for applying the privacy mask. For example, a privacy mask may be applied only between certain times of the day. The privacy mask data may also include parameters defining a level of masking eg a level of blurring, and may also include information indicating certain user permissions that allow some users to remove the masking.

The video surveillance system of FIG. 1 is an example of a system in which the present invention can be implemented. However, other architectures are possible. For example, the system of FIG. 1 is an "on premises" system, but the present invention can also be implemented in a cloud based system. In a cloud based system, the cameras stream data to the cloud, and at least the recording server 150 is in the cloud. Additionally, video analytics may be carried out in the cloud. The operator client or mobile client requests the video data to be viewed by the user from the cloud.

An embodiment of the present invention will now be described with reference to FIGS. 2 and 3.

Figure 2:
FIG. 2 illustrates the field of view of a camera with a privacy mask.

FIG. 2 illustrates the field of view of a camera showing an outline of a privacy mask 1 which covers the interior windows and door of a building. Only the outline of the privacy mask 1 is illustrated, but the areas within the outline of the privacy mask 1 would be obscured by a block colour or pixelation/blurring so that a user viewing the video (either live or recorded) can only view the inside of the building and not anything outside of the building. As shown by FIG. 2, there are vehicles parked outside the building in the areas covered by the privacy mask 1 which would be obscured by the privacy mask.

In this embodiment, the privacy masking of the metadata is carried out by the operator client 120, on the basis of privacy mask data which defines a position of a privacy mask in the frame. The privacy mask 1 is applied by the operator client 120, which stores privacy mask data and applies the mask to the video data when it is viewed (either live or recorded).

The operator client 120 acquires the metadata from the recording server 150. The video surveillance data already includes the metadata generated by video analytics carried out elsewhere (eg at an analytics server, recording server or camera).

Location data of each item of metadata in its respective frame is compared with a position of the privacy mask, based on the privacy mask data, and it is determined whether the metadata is to be masked. In other words, it is determined whether the metadata is to be output or not. The location data is the location in the frame of the object or activity to which the metadata refers. So, for example, if the metadata relates to a vehicle and includes data describing the vehicle eg colour, model, license plate, and location data of the vehicle, all of the metadata relating to the vehicle is masked if it is determined that the location of the vehicle in the frame falls within the privacy masked region.

If it is determined that an item of metadata is to be masked, then that item of metadata can be excluded or flagged in a way such that it is ignored by a subsequent search facility.

A search facility of the operator client 120 allows a user to look for a specific object or event by searching metadata. Metadata generated by video analytics such as object and behaviour recognition discussed above can allow a user to search for specific objects (eg white van or man wearing a red baseball cap). The operator client 120 or the mobile client 160 will receive user input of at least one search criterion, and generate a search query.

A search is then carried out for metadata matching the search query. The search software then sends a request to extract image data from the recording server 150 corresponding to portions of the video data having metadata matching the search query, based on the timestamp of the video data. This extracted image data is then received by the operator client 120 or mobile client 160 and presented to the user at the operator client 120 or mobile client 160 as search results, typically in the form of a plurality of thumbnail images, wherein the user can click on each thumbnail image to view a video clip that includes the object or activity.

In the above embodiment, because the metadata has been masked to exclude or flag the metadata from privacy masked regions, no image data in which objects or activity matching the search criteria are present in the privacy masked regions will appear in the search results.

Figure 3:
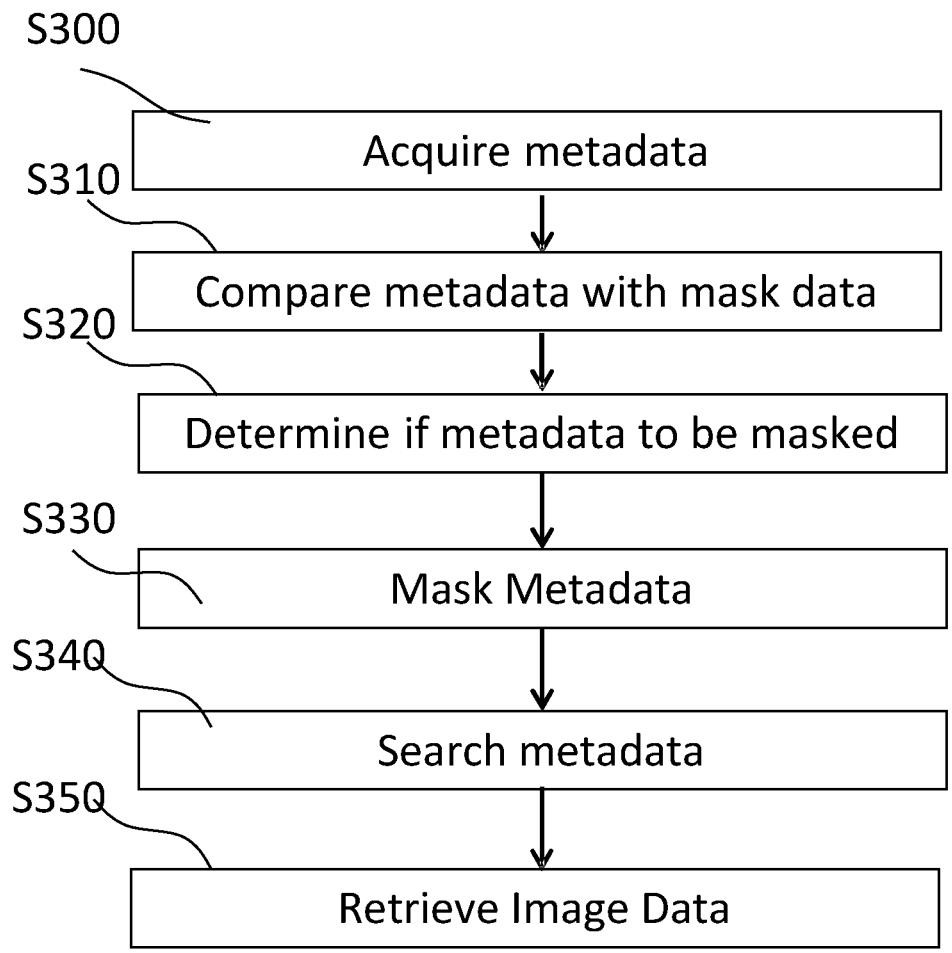
FIG. 3 is a flow chart of a method according to an embodiment of the present invention.

FIG. 3 is a flow chart of the method as carried out by the operator client 120. In step S300 the operator client 120 acquires the metadata. In step S310, the location of each item of metadata is compared with privacy mask data, and in step S320 it is determined that the item of metadata is to be masked if its location overlaps the privacy mask. In step S330, the metadata is masked if it is determined in step S320 that the metadata is to be masked. In step S340, the metadata search is carried out on the masked metadata, and in step S350, image data corresponding to the results is retrieved and displayed to the user.

In an alternative embodiment, the search can take place before the privacy masking of the metadata, ie in FIG. 3, step S340 occurs after S300 and before S310. In this case, the metadata is searched and then the locations of the metadata matching the search are compared to the privacy mask data.

If the masking is carried out before the search, then all the metadata is either masked or not masked, and the search is only carried out on the unmasked metadata, therefore the search results do not include any results from the masked areas.

If the masking is carried out after the search, the location of metadata that matches the search criteria is compared with the privacy mask, and masked from the search results.

In the above described embodiment, the metadata which is associated with the video data is searched using a search facility of the operator client 120 (or the mobile client 160). This embodiment has been described with reference to the operator client 120 but it will be understood that any steps carried out by the operator client could also be carried out by the mobile client 160.

There are also further alternative ways in which the invention could be implemented. For example, the metadata could be masked at the recording server 150 before it is sent to the operator client 120. The recording server 150 could receive the privacy mask data either from the management server 130 or from the operator client 120, and carry out the masking of the metadata. In this case, either only unmasked metadata is sent to the operator client 120, or the masked metadata is flagged as private. However, sending only the unmasked metadata after masking has the advantage of reducing the amount of data sent. The search step is then carried out at the operator client 120. Alternatively, the search could be carried out at the recording server 150, with the search query being sent from the operator client 120. With respect to a cloud based system, the masking could take place in the cloud.

Some cameras are capable of carrying out analytics that generate metadata, and it would also be possible to apply privacy masking to the metadata at the camera. However, this means that metadata from masked regions is not stored at the recording server 150. One benefit of masking the metadata at the operator client 120 is that it allows for the lifting of the mask by users having certain user privileges. This feature may be used to lift the privacy mask, for example, in the investigation of a crime.

For example, in an embodiment which outputs the video data stream to an external apparatus together with the metadata, the metadata can be output together with the image data, when the position where the metadata is detected overlaps with the privacy mask. In this embodiment the metadata is not output together with the image data, when the position where the metadata is detected does not overlap with the privacy mask. In this embodiment, all the metadata can be output together with the image data, when a user of the external apparatus has user privileges.

While the present invention has been described with reference to embodiments, it is to be understood that the invention is not limited to the disclosed embodiments. The present invention can be implemented in various forms without departing from the principal features of the present invention as defined by the claims.

The invention claimed is:

1. A computer implemented method of privacy masking video surveillance data, wherein the video surveillance data includes metadata associated with video data, the metadata describing objects or activity in the video data and including location data defining a location within a frame of the object or activity to which the metadata relates, comprising:
    comparing the location data with privacy mask data defining a position of a privacy mask in the frame; and
    based on the comparison, determining if the metadata is to be masked and masking the metadata if it is determined that the metadata is to be masked.

2. The method according to claim 1, wherein masking the metadata comprises excluding the metadata.

3. The method according to claim 1, wherein masking the metadata comprises flagging the metadata as masked such that it is excluded by a subsequent search.

4. The method according to claim 1, wherein the location data includes coordinates of a bounding box, and wherein the privacy mask is defined by coordinates and the step of comparing the location data with privacy mask data comprises determining if the bounding box overlaps the privacy mask based on the coordinates of the bounding box and the privacy mask.

5. A computer implemented method of searching video surveillance data based on metadata associated with the video surveillance data comprising carrying out the method of privacy masking video surveillance data, wherein the video surveillance data includes metadata associated with video data, the metadata describing objects or activity in the video data and including location data defining a location within a frame of the object or activity to which the metadata relates, comprising:

comparing the location data with privacy mask data defining a position of a privacy mask in the frame;

based on the comparison, determining if the metadata is to be masked and masking the metadata if it is determined that the metadata is to be masked; and carrying out a search for metadata matching a search criterion.

6. The method according to claim 5, wherein the search is carried out before the masking such that the masking is carried out on the metadata matching the search criterion.

7. The method according to claim 5, wherein the search is carried out after the masking such that the search is carried out on the masked metadata.

8. The method according to claim 5, comprising the step of retrieving image data from the video data corresponding to the masked search results.

9. A non-transitory computer-readable medium including a computer program which, when run on a computer, causes the computer to carry out the method according to claim 1.

10. A system for privacy masking video surveillance data, wherein the video surveillance data includes metadata associated with video data, the metadata describing objects or activity in the video data and including location data defining a location within a frame of the object or activity to which the metadata relates, comprising:

masking means configured to comparing the location data with privacy mask data defining a position of a privacy mask in the frame; and based on the comparison, determine if the metadata is to be masked and mask the metadata if it is determined that the metadata is to be masked.

11. The system according to claim 10, wherein the metadata includes coordinates of a bounding box, and wherein the privacy mask is defined by coordinates and the masking means is configured to determine if the bounding box overlaps the privacy mask based on the coordinates of the bounding box and the privacy mask.

12. The system according to claim 10, further comprising search means configured to carry out a search for metadata matching a search criterion.

13. The system according to claim 12, wherein the search means is configured to carry out the search before the masking such that the masking is carried out on the metadata matching the search criterion.

14. The system according to claim 12, wherein the search means is configured to carry out the search after the masking such that the search is carried out on the masked metadata.

15. The system according to claim 12, comprising means to generate a request to retrieve image data from the video data corresponding to the masked search results.

* * * * *